US010885243B1

(12) United States Patent
Neves et al.

(10) Patent No.: US 10,885,243 B1
(45) Date of Patent: *Jan. 5, 2021

(54) LOGIC PARTITION REPORTING FOR INTEGRATED CIRCUIT DESIGN

(71) Applicant: International Business Machines Corporation, Armonk, NY (US)

(72) Inventors: Jose Neves, Poughkeepsie, NY (US); Adam Matheny, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,511

(22) Filed: Sep. 3, 2019

(51) Int. Cl.
*G06F 30/30* (2020.01)
*G06F 30/392* (2020.01)
*G06F 119/12* (2020.01)
*G06F 30/3312* (2020.01)

(52) U.S. Cl.
CPC ............ *G06F 30/30* (2020.01); *G06F 30/392* (2020.01); *G06F 30/3312* (2020.01); *G06F 2119/12* (2020.01)

(58) Field of Classification Search
CPC ........ G06F 30/30; G06F 30/32; G06F 30/327; G06F 30/33; G06F 30/3312; G06F 30/3315; G06F 30/347; G06F 30/39; G06F 30/92; G06F 2219/12
USPC ........................................ 716/108, 110, 113
See application file for complete search history.

(56) References Cited

U.S. PATENT DOCUMENTS

| | | | |
|---|---|---|---|
| 5,128,871 | A | 7/1992 | Schmitz |
| 5,649,165 | A | 7/1997 | Jain et al. |
| 5,912,820 | A | 6/1999 | Kerzman et al. |
| 6,058,252 | A | 5/2000 | Noll |
| 6,286,128 | B1 | 9/2001 | Pileggi et al. |
| 7,404,168 | B2 | 7/2008 | Miller et al. |
| 10,216,890 | B2 | 2/2019 | Qian |
| 2002/0138816 | A1 | 9/2002 | Sarrafzadeh et al. |
| 2003/0023943 | A1 | 1/2003 | Teig |

(Continued)

OTHER PUBLICATIONS

Transmittal Form PTO/SB/21 signed Mar. 16, 2020.
(Continued)

*Primary Examiner* — Paul Dinh
(74) *Attorney, Agent, or Firm* — Cantor Colburn LLP; William Kinnaman (57) ABSTRACT

Techniques for logic partition reporting for an integrated circuit (IC) design are described herein. An aspect includes generating a physical domain representation of an IC design based on a logic domain representation that includes a plurality of logic partitions, the physical domain representation including a plurality of logic clusters, each corresponding to a respective logic partition. Another aspect includes assigning a logic partition identifier corresponding to a logic partition of the plurality of logic partitions to each IC element in the physical domain representation. Another aspect includes assigning a pin name to each of the plurality of pins corresponding to the plurality of IC elements, wherein a pin name is derived based on the logic partition identifier of the IC element associated with the pin. Another aspect includes generating a timing report for a logic cluster based on the logic partition identifiers and the pin names.

17 Claims, 5 Drawing Sheets

(56) References Cited

U.S. PATENT DOCUMENTS

| | | | |
|---|---|---|---|
| 2005/0198601 A1* | 9/2005 | Kuang | G06F 30/33 |
| | | | 716/108 |
| 2005/0268158 A1 | 12/2005 | McIntosh et al. | |
| 2009/0178017 A1* | 7/2009 | Gupta | G06F 30/327 |
| | | | 716/137 |
| 2015/0026653 A1* | 1/2015 | Stevens | G06F 30/3312 |
| | | | 716/108 |

OTHER PUBLICATIONS

IBM "List of IBM Patents or Patent Applications Treated As Related; (Appendix P)", Filed Sep. 4, 2019, 2 pages.

Intel, "AN 704: FPGA-based Safety Separation Design Flow for Rapid Functional Safety Certification," https://www.intel.com/content/dam/www/programmable/us/en/pdfs/literature/an/an704.pdf, Jan. 1, 2018, 27 Pages.

Neves et al., "Logic Partition Identifiers for Integrated Circuit Design," U.S. Appl. No. 16/558,508, filed Sep. 3, 2019.

Salek et al., "An Integrated Logical and Physical Design Flow for Deep Submicron Circuits," https://pdfs.semanticscholar.org/99a5/be9b5cddc0175336eaa1e5b7f4048480c349.pdf, Jun. 5, 2008, 31 Pages.

* cited by examiner

```
┌─────────────────────────────────┐   ┌─────────────────────────────────┐
│ LOGIC CLUSTER 1:          401   │   │ LOGIC CLUSTER 2:          402   │
│ LP GATES          : 64714       │   │ LP GATES          : 33155       │
│ LP I/O PINS       : 7855/2111   │   │ LP I/O PINS       : 6325/3370   │
│ LP I/O < 0 SLACK  : 9/1         │   │ LP I/O < 0 SLACK  : 0/0         │
│ LP I/O SLACK      : -22.3/-10.5 │   │ LP I/O SLACK      : 1.0/10.0    │
│ LP I/O FOM        : -146.2/-10.5│   │ LP I/O FOM        : 0/0         │
│ LP LATCHES        : 8847        │   │ LP LATCHES        : 5912        │
│ LP NUMNEGS        : 21          │   │ LP NUMNEGS        : 0           │
│ LP INTERNAL SLACK : -22.3       │   │ LP INTERNAL SLACK : 1.0         │
└─────────────────────────────────┘   └─────────────────────────────────┘

┌─────────────────────────────────┐   ┌─────────────────────────────────┐
│ LOGIC CLUSTER 3:          403   │   │ LOGIC CLUSTER 4:          404   │
│ LP GATES          : 33151       │   │ LP GATES          : 18743       │
│ LP I/O PINS       : 1841/365    │   │ LP I/O PINS       : 3332/1183   │
│ LP I/O < 0 SLACK  : 0/0         │   │ LP I/O < 0 SLACK  : 408/1       │
│ LP I/O SLACK      : 9.2/7.3     │   │ LP I/O SLACK      : -39.1/-0.5  │
│ LP I/O FOM        : 0/0         │   │ LP I/O FOM        : -11153.9/-.5│
│ LP LATCHES        : 4113        │   │ LP LATCHES        : 4084        │
│ LP NUMNEGS        : 0           │   │ LP NUMNEGS        : 329         │
│ LP INTERNAL SLACK : 0.5         │   │ LP INTERNAL SLACK : -39.1       │
└─────────────────────────────────┘   └─────────────────────────────────┘
```

LOGIC PARTITION REPORTING FOR INTEGRATED CIRCUIT DESIGN

BACKGROUND

The present invention generally relates to integrated circuits (ICs), and more specifically, to logic partition reporting for an IC design.

A goal of IC chip design may be to increase performance and reduce power dissipation of the chip while minimizing the impact to the functions performed by the chip. Increasing performance makes the IC chip run faster at the expense of consuming more power. Reducing the power consumption reduces the temperature of the chip during operation, and may reduce the resources that are required to cool the chip during operation. In an IC design, designers link logic blocks together to form the chip. The logic blocks may include a relatively large number (e.g., millions) of elements. The power requirements of the IC may be reduced if the number and/or size of any of the elements in the IC may be reduced; however, any reductions may impact timing in the IC. An IC, such as a microprocessor or application-specific IC (ASIC), may include on the order of billions of transistors and miles of interconnected wires. Analysis of an IC design for, for example, power reduction or error correction, may be performed based on an abstract representation of the interconnected elements (e.g., gates, buffers, inverters, etc.) of the IC design.

SUMMARY

Embodiments of the present invention are directed to logic partition reporting for an integrated circuit (IC) design. A non-limiting example computer-implemented method includes generating a physical domain representation of an IC design based on a logic domain representation of the IC design, wherein the logic domain representation comprises a plurality of logic partitions, and wherein the physical domain representation comprises a plurality of logic clusters, each of the plurality of logic clusters corresponding to a respective logic partition of the plurality of logic partitions, wherein each of the plurality of logic clusters comprises a respective plurality of IC elements corresponding to the respective logic partition. The method also includes assigning a logic partition identifier to each IC element of the plurality of IC elements in the physical domain representation, wherein the logic partition identifier of an IC element corresponds to a logic partition of the plurality of logic partitions, and wherein each IC element comprises a plurality of pins. The method also includes assigning a pin name to each of the plurality of pins corresponding to the plurality of IC elements, wherein a pin name of a pin of the plurality of pins is derived based on the logic partition identifier of the IC element associated with the pin. The method also includes generating a timing report for a logic cluster of the IC design based on the logic partition identifiers and the pin names of the IC elements in the logic cluster.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide logic partition reporting for an integrated circuit (IC) design. A hierarchy may be used to describe a relatively complex IC design in order to break the IC design into smaller, more manageable blocks that may be handled concurrently by various units in a distributed design team. Such a design team may include many engineers that address different aspects of the design process, including but not limited to design architects, logic designers, physical and timing engineers. Due to size, complexity, and performance requirements, it may not be feasible to preserve the hierarchical representation across design domains (e.g., logic, physical, and timing domains). For example, a hierarchical representation in the physical domain may require fewer levels than a hierarchical representation in the logic domain. Further, a hierarchical representation in the timing domain may require fewer levels than a hierarchical representation in the logic domain, and fewer levels than a hierarchical representation in the physical domain. For example, a multi-level physical hierarchical IC design representation may be represented in the physical domain with five levels of hierarchy. In the timing domain, the same design may only require two levels of hierarchy, e.g., the core itself and the macro level. In the logic domain, the physical hierarchy may be represented with more hierarchical levels, as the size of a macro may vary from a few thousand gates to several million gates. The relatively large size of the macro may translate into additional levels of hierarchy in the logic domain. In the physical domain, the hierarchy in the logic domain may be implemented to manage design complexity, turn-around time (TAT) and verification.

A logic domain representation may include a plurality of logic blocks, and each logic block may be subdivided into a plurality of logic partitions, and/or intellectual property (IP) blocks. The logic domain representation may represent only critical paths in the IC design and not the complete design, such that relevant information may not be seen by a logic designer until relatively late in the design cycle. If, for example, a logic domain representation of an IC design is translated into the physical domain or timing domain, it may be difficult to correlate timing, power, and logic data back to the logic partitions described in the logic domain representation for analysis, detection, and correction of failures. Therefore, in order to provide a link between the logic partitions of the logic domain representation of an IC design and the logic clusters of the physical domain representation, the logic domain and the physical domain may be linked through the timing domain via logic partition identifiers. The logic partition identifiers may include assigning identifiers to elements (e.g., gates) in the logic clusters of the physical domain representation; the identifiers may indicate the particular logic partition to which each element belongs in the logic domain. In the logic domain, retrieval of elements within each physical block is enabled through the use of the element identifiers, and, based on pin information, timing information may be retrieved. In the physical domain, timing information for the logic partitions may be obtained, even for logic partitions that are spread between different physical blocks. Logic partitions, or portions of logic partitions, may be placed anywhere in the physical design, and the timing information for each individual logic partition or portion of a logic partition may be obtained.

Reports, such as endpoint reports, may be generated and analyzed based on the assigned element identifiers to determine whether logic clusters of the physical design perform within timing constraints. The reports may include a timing view of each logic cluster in the physical domain. Embodiments of logic partition reporting may allow an IC designer to see failing logic partitions in the IC, as well as a degree of fail. Delay analysis tools may be used to give an IC designer the capability to determine if any portion of the IC design can be successfully physically implemented based on the logic partition reporting. A physical designer may be enabled to evaluate design implementations without prior physical constraints, such as area, wire and pin constraints. A logic designer may be given the ability to evaluate the physical implementation of a given logic partition. Embodiments of logic partition reporting may be used to take timing into account while performing physical design planning, in which floorplan, placement, timing, and wire synthesis tasks for the IC design are performed. The IC design may be corrected based on the reports that are generated based on the logic partition identifiers, and a physical IC may then be fabricated based on the corrected IC design.

Design characteristics such as timing, power, area, and wiring may be reported for a logic partition in the context of an entire IC design in the physical domain. Timing may be described in terms of a logic partition in order to provide a full view of the state of the design. Based on the unique identifiers corresponding to logic partitions, a designer may generate an endpoint report for the logic partition in the physical domain. The report may be given in the context of the logic partition in the physical IC design, and the designer may choose whether to focus on the internals of a single logic partition, or on an interface with neighboring logic in one or more other logic partitions. Examples of reports may include data based on the contents of a single logic partition and any direct child logic partition, data on boundary pins or nets of a specified logic partition, and data on the IC elements (e.g., gates, latches, nets) contained in a logic partition. Any appropriate type of report, containing any appropriate data, may be generated for a logic partition in various embodiments.

Embodiments of logic partition reporting for an IC design preserve the relationship between the logic hierarchy and the physical hierarchy. A reporting framework is provided in which tracing mechanisms and marker preservation synchronize the logic and physical domains throughout the IC design process. The framework may provide a basis for developing IC design tools, including analysis tools that provide insight into the IC design. Cooperation between different design groups, such as logic, physical and timing designers, may be enabled. Embodiments of logic partition reporting for an IC design may include various analysis tools, including but not limited to timing analysis, power analysis, resource analysis (e.g., availability of space and wires), and noise analysis.

Figure 1:
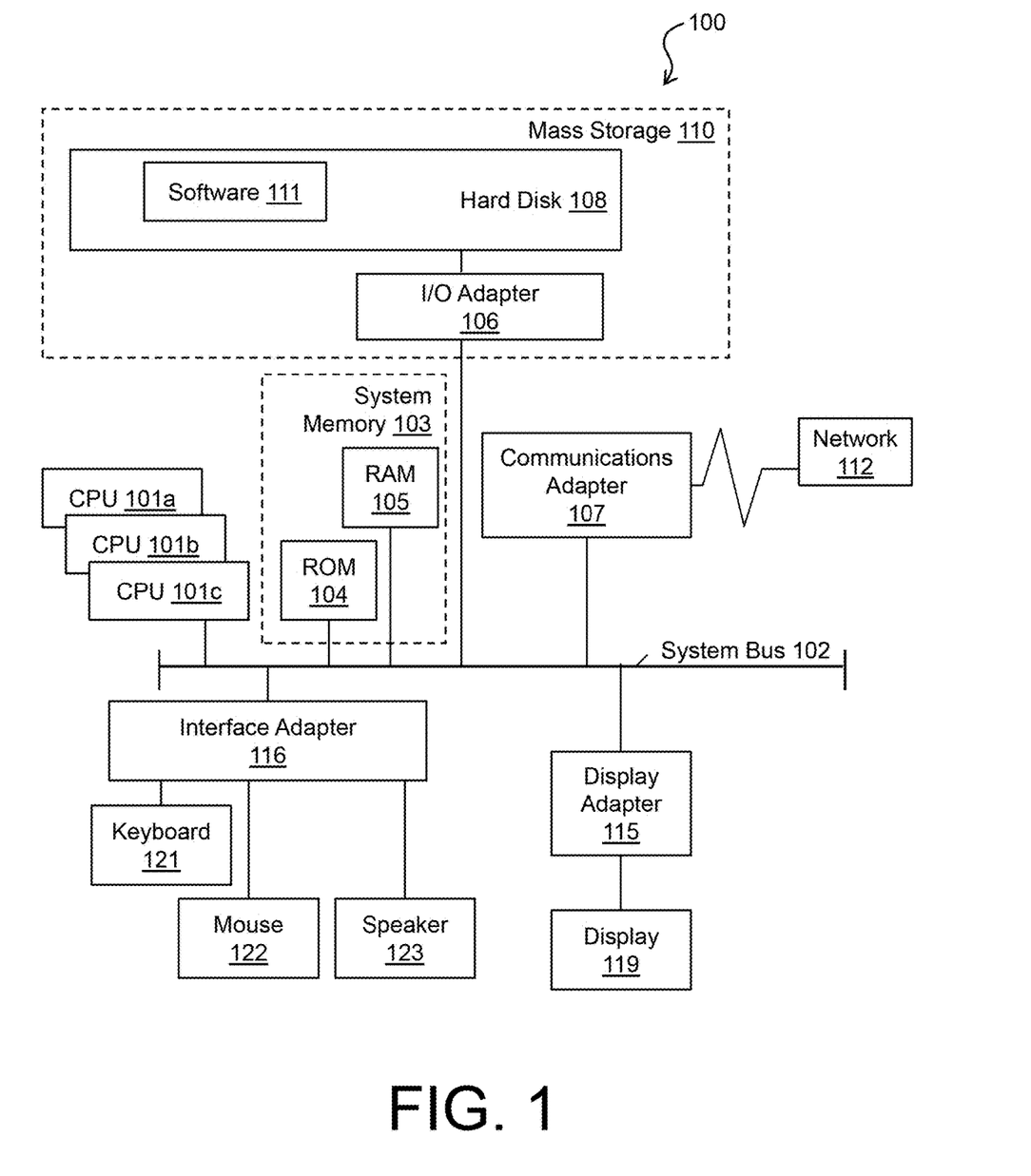
FIG. 1 is a block diagram of an example computer system for use in conjunction with logic partition reporting for an integrated circuit (IC) design in accordance with one or more embodiments of the present invention.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
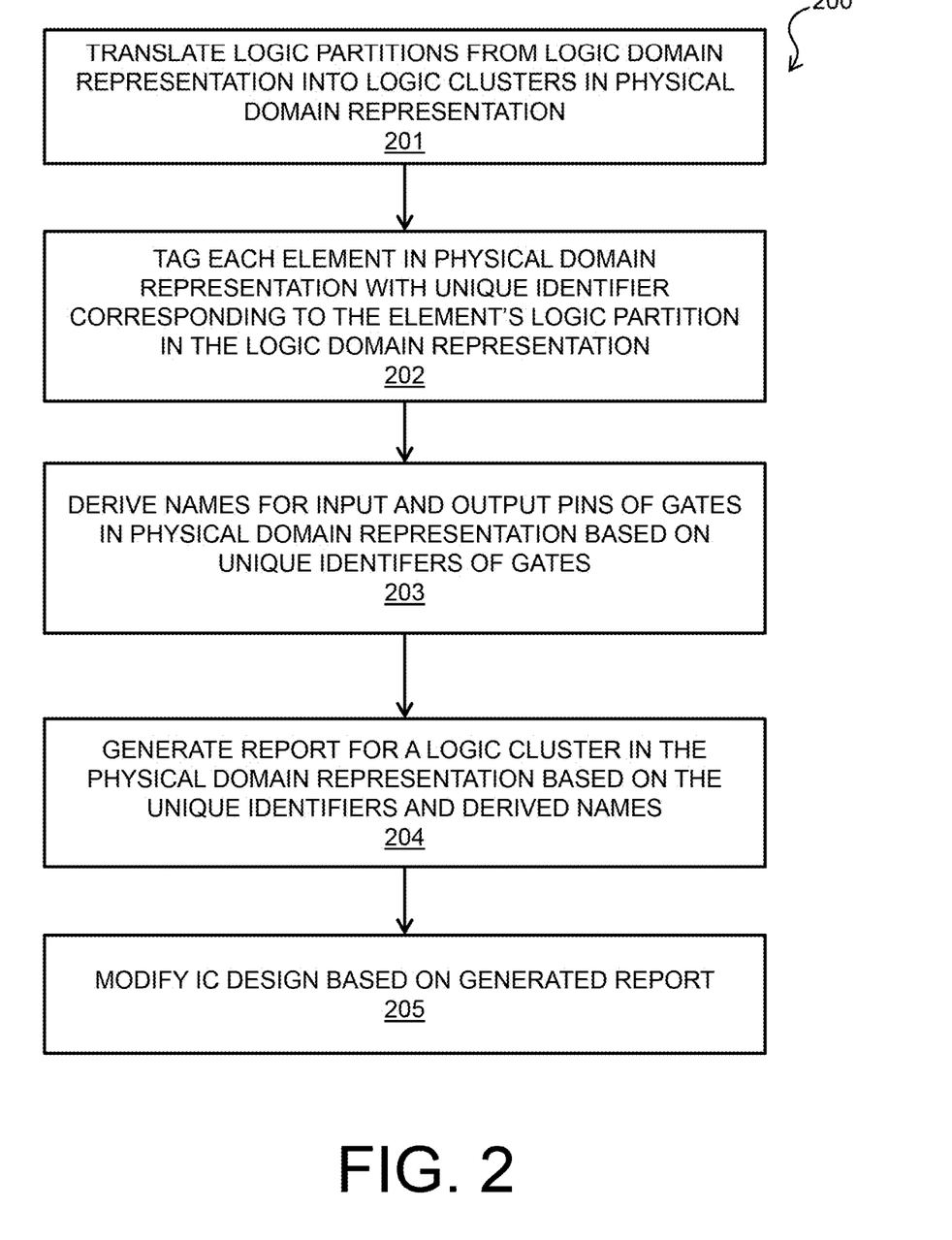
FIG. 2 is a flow diagram of a process for logic partition reporting for an IC design in accordance with one or more embodiments of the present invention.

FIG. 2 shows a process flow diagram of a method 200 for logic partition reporting for an IC design in accordance with one or more embodiments of the present invention. Method 200 may be implemented in conjunction with a computer system such as computer system 100 of FIG. 1; in some embodiments, method 200 may be implemented in software 111 of FIG. 1. In block 201, a logic domain representation of an IC is received, and the logic domain representation is translated into the physical domain to generate a physical domain representation of the IC. The logic domain representation is a description of the design of the IC in the logic domain. The logic domain representation includes any appropriate number of logic blocks and associated logic partitions that may each perform a particular function in the IC. Each logic partition in the logic domain representation may include a respective plurality of elements, including but not limited to logic gates. The logic domain representation may have logic partitions corresponding to fixed constraints and physical boundaries for physical locations on a chip. The fixed constraints may include a fixed pin layout in some embodiments. The logic domain representation may be received by a framework that implements embodiments of logic partition reporting for an IC design. The elements of the logic partitions in the logic domain representation may be translated into logic clusters that are spread across the physical implementation of the IC. The logic clusters may not be bound by any fixed constraints or physical boundaries for the physical locations on the chip, and the logic clusters may spread beyond the physical boundaries of the logic partitions as described in the logic domain representation. Any explicit marks added by a logic designer to preserve the identification of one or more logic partitions may be preserved in the physical domain representation (e.g., a logic synthesis tools may not destroy the logic block boundaries). The logic partition boundaries may be propagated to the timing representation where they are also recognized by the framework, which may include a tool for visualizing the logic partition hierarchy.

In block 202, internal parameters are generated for each of the logic clusters in the physical domain. Each element in the logic clusters of the physical domain representation may be tagged with a unique identifier (e.g., a prefix) indicating the element's logic partition in the logic domain. For example, a gate in a logic cluster of the physical domain representation may be tagged with a unique identifier that indicates the gate's logic partition in the logic domain representation. The internal parameters for each of the logic clusters may include timing information in some embodiments. Using a tracing mechanism through the timing graph to analyze the timing behavior of the IC design, such as direct acyclic graph (DAG), any logic gate in the physical design may be associated to a corresponding logic partition at any stage of the IC design using the assigned unique identifiers.

In block 203, unique pin names for input pins and output pins of gates in the physical domain are derived based on the unique logic partition identifiers that were assigned to the gates in block 202 of method 200. Gates on a timing path may contain any appropriate numbers of inputs and multiple outputs. For example, a two input NAND logic gate may have two inputs and one output. In a timing report, the two input NAND gate may be part of at least two timing paths. The timing at each input of the two inputs of the NAND gate may be different. If the difference in timing between the input pins is significant, the paths through the two inputs may not be adjacent in the report. As such, a designer may not be able to identify a path with the lowest slack until all the other paths with worse slack are resolved. Timing points that are used for timing analysis of the IC design may include input and/or output pins of gates, and the timing points may be represented in an endpoint report with a unique name derived from the associated gate name, including the gate's assigned unique identifier. The unique pin names that are derived in block 203 associate input and output pins of gates in the physical domain to specific logic partitions in the logic domain.

In block 204, data, including timing information, for a logic partition of the logic domain representation may be determined in the physical domain based on the unique identifiers and pin names that were assigned to the elements in blocks 202-203. The unique identifiers may be used to map IC elements (e.g., gates) from the logic domain to the physical domain, and from the physical domain to the logic domain. Further, physical design information, such as specific pin information, may be generated for logic partitions of the IC in block 204 based on the logic domain representation of the IC using the unique identifiers and associated derived pin names that were assigned in block 202-203.

Figure 4:
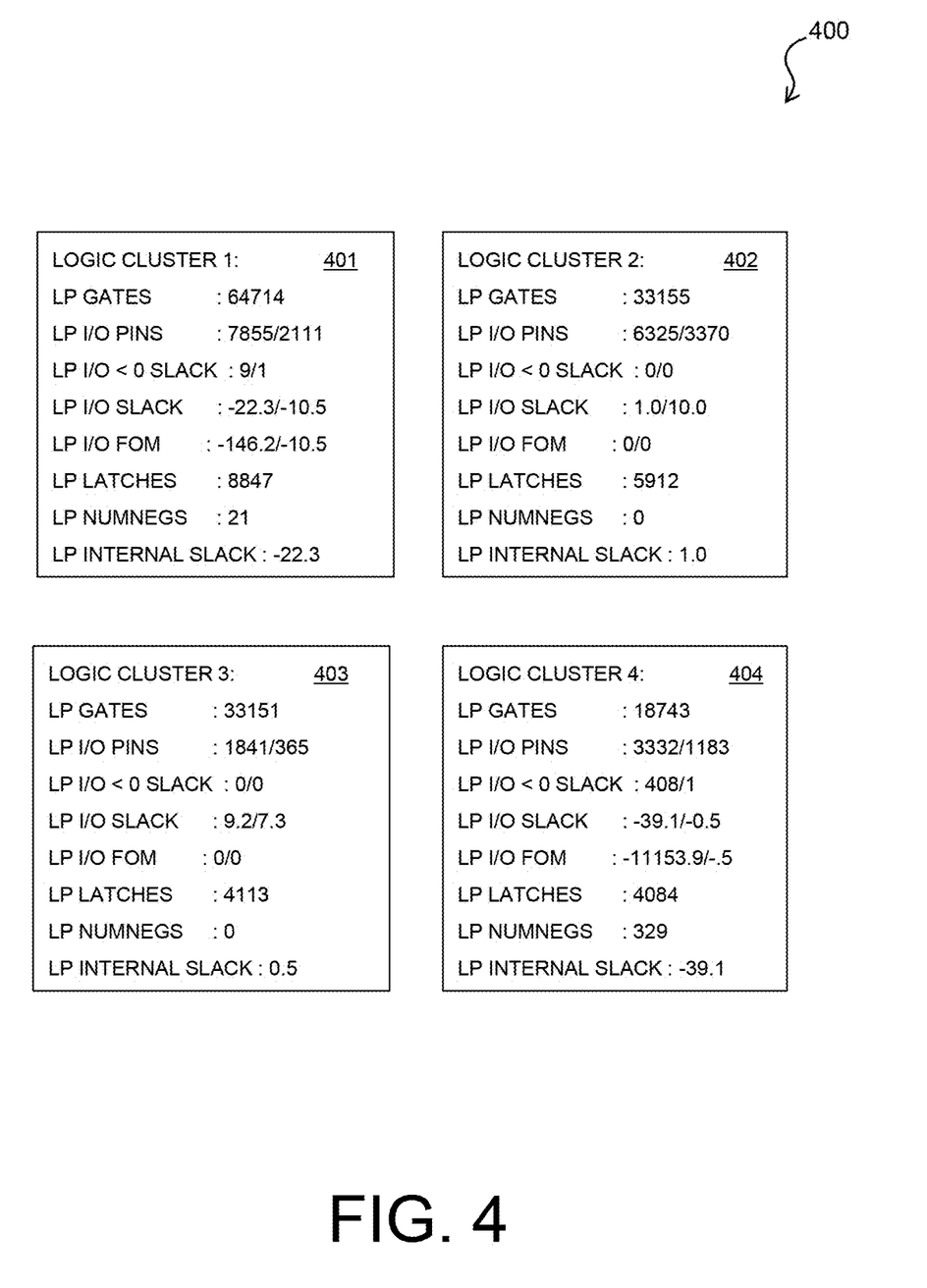
FIG. 4 is a block diagram of components of another system for logic partition reporting for an IC design in accordance with one or more embodiments of the present invention.

Timing analysis may be performed in block 204 of FIG. 4 by reporting timing on a logic path from a start of the path to an endpoint of the path to generate a detailed description of the timing along each pin in the path, which may include any appropriate path information such as slack, slew, pin name, gate delay, net delay, physical location of certain gates, and properties assigned to nets and gates. A timing path is a sequence of timing points extracted from the timing graph (e.g., DAG) by traversing the timing graph to build a path of connected points from an input to an endpoint. Each timing point identifies a relevant part of the design. For example, a timing point may be the input pin of a logic gate, a next timing point maybe the output pin of the logic gate. The input and output pins of the logic gate may be identified based on the unique names that were derived in block 203. In order to report design characteristics such as timing, area, and wiring with a relatively accurate view of the whole design, timing may be described in terms of logic blocks and logic partitions. With the logic partition framework, a designer may choose a logic block and generate an endpoint report for the logic block. A report that is generated in block 204 may focus on the internal structure of the logic block, or the interface with other logic blocks.

Reports may be generated at the logic block level that include information about a single logic block. Reports may also be generated in block 204 that include information about a logic block and its neighboring logic. Examples of reports may include data based on the contents of a single logical block or logical partition, and any direct children blocks, data regarding boundary pins or nets of a specified logic block, and data regarding the gates, latches, or nets contained in a logical block. For timing analysis, a block level report may be generated in block 204 for any given hierarchical level and immediate children ordered by worst slack. The block level report may be used to identify which children have the worst slack. A designer may select one or more children and repeat the generation of report in block 204. In various embodiments, report generation may be performed in block 204 through a command line interface, or using a visual planning tool that navigates through the hierarchy of the IC design. By selecting a block in the visual tool, all the cells associated with the block (including children) may be highlighted in the visual tool. The designer may generate a report for any selected block based on the visual tool. The logic blocks may be described and organized by any appropriate design features, including but not limited to a number of internal negative latch to latch paths, a total number of latch-to-latch paths, and/or a total number of gates negative in slack. A block with a negative slack may be an outlier, while a block with many internal latch-to-latch negative paths may be a structural problem that may require significant design and architecture changes. Information on the boundaries of logic partitions may also be reported in block 204 for use by, for example, floorplan tools. Further embodiments of logic partition reporting as described with respect to method 200 of FIG. 2 may include generating a report for a specific child of logic partition having a specified number of reporting child logic partitions, sorting the children by worst latch-to-latch-slack, and generating endpoint reports for the endpoints in the logic partition.

In some embodiments of logic partition reporting according to method 200 of FIG. 2, a logic partition report command may be provided. The logic partition report command may, given a logic partition identifier as input, generate a report including data based on the contents of this particular logic partition and any direct child partitions in block 204 of FIG. 2. In some embodiments of logic partition reporting, a lp_get_boundaries command may be provided. The lp_get_boundaries command may, given a logic partition identifier as input, return the boundary pins, gates, or nets of the input logic partition in block 204 of FIG. 2. In some embodiments of logic partition reporting, a lp_get_gates command may be provided. The lp_get_gates command may, given a logic partition identifier as input, return the gates contained within the logic partition in block 204 of FIG. 2. In some embodiments of logic partition reporting, a lp_get_latches command may be provided. The lp_get_latches command may, given a logic partition identifier as input, return the latches contained within the logic partition in block 204 of FIG. 2. In some embodiments of logic partition reporting, a lp_get_nets command may be provided. The lp_get_nets command may, given a logic partition identifier as input, return the nets contained within the logic partition in block 204 of FIG. 2. In some embodiments of logic partition reporting, a lp_set_env command may be provided. The lp_set_env command may set one or more environment settings for logic partition reporting in block 204 of FIG. 2. For example, a linear monolithic (LM) threshold may be set using the lp_set_env command. In some embodiments of logic partition reporting, a lp_get_env command may be provided. The lp_get_env command may retrieve one or more current environment settings for logic partition reporting in block 204 of FIG. 2. In some embodiments of logic partition reporting, a lp_reset_node_map command may be provided. The lp_reset_node_map command may clear the logic partition cache for updates in block 204 of FIG. 2.

In block 205, the IC design may be corrected based on the reports that were generated based on the logic partition identifiers and pin names in block 204, and a physical IC may be fabricated based on the corrected IC design. A tracing mechanism that is associated with visual tools may be used to navigate through the design hierarchy in block 205 based on reports that are generated in block 204 using the unique identifiers and pin names that were assigned in blocks 202-203. Without physical information, but with gate delay information, a logic designer may obtain information on any design paths of interest in the IC design. Because physical impacts on delay may be caused by signal degradation on wires in newer IC technologies, a logic designer may also use a design planning (DP) tool (e.g., efinaleDP) to generate a physical prototype of the IC design in which wire parasitic delay is added to path delay. Using a navigation tool to walk through the hierarchy may allow a designer to identify relevant logic partitions that may require modification to reduce delay. Physical partitioning may be simultaneously performed by logic designers and physical designers to define physical boundaries to certain logic partitions as needed. Because the planning phase of an IC design may be relatively fast and integrated using the framework in conjunction with other physical and analysis tools, logic designers may not have to rely on physical designers to obtain information regarding early physical implementations in order to determine the quality and accuracy of synthesis. Using the framework described with respect to method 200 of FIG. 2, a logic designer may inspect the physical implementation of the IC design in block 205 and focus on particular areas in the design to analyze and correct any area in the design that may have a problem, including but not limited to timing, power, and/or noise problems.

Example embodiments of a logic domain representation, such as is received in block 201 of method 200, and a physical domain representation, as is generated in block 202 of method 200, are discussed below with respect to FIG. 3. Example embodiments of data reports that may be generated in block 204 of FIG. 2 based on the unique identifiers that are assigned in blocks 202 and 203 are discussed below with respect to FIG. 4. Fabrication of the physical IC as is performed in block 205 is discussed in further detail below with respect to FIG. 5.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
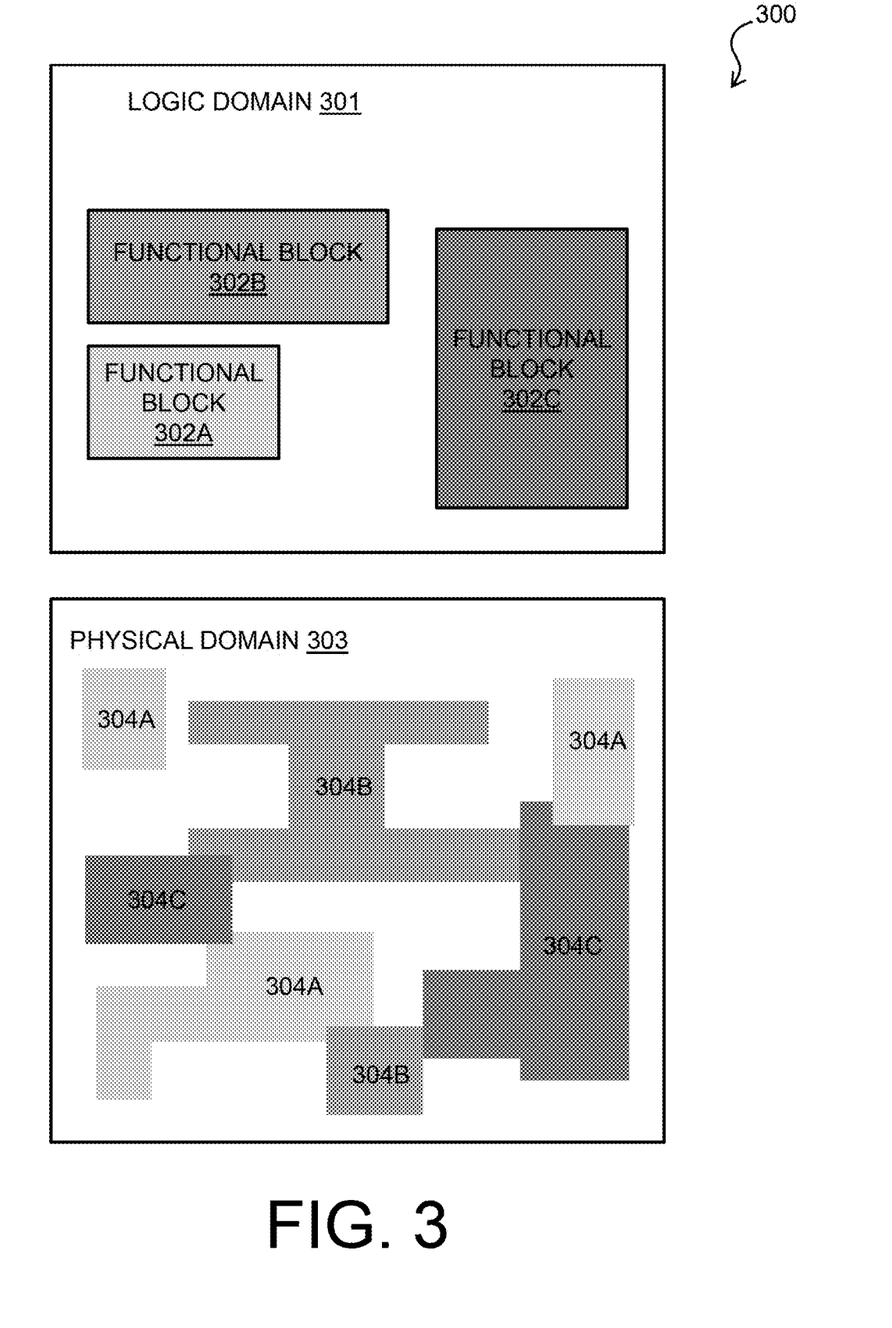
FIG. 3 is a block diagram of components of a system for logic partition reporting for an IC design in accordance with one or more embodiments of the present invention.

FIG. 3 shows a system 300 for logic partition reporting for an IC design in accordance with one or more embodiments of the present invention. System 300 illustrates logic domain representation 301 comprising a description of a logic design of an IC design, and a physical domain representation 303 of the same IC design. As shown in FIG. 3, in the logic domain representation 301, there are three distinct logic partitions 302A-C. Each of logic partitions 302A-C may include a plurality of logic elements (e.g., logic gates) that are configured to perform a function corresponding to the particular logic partition. Logic domain representation 301 may include timing information for the elements of each of the logic partitions 302A-C. The boundaries of a logic partition such as logic partitions 302A-C may be determined in any appropriate manner. In some embodiments, the boundaries of a logic partition such as logic partitions 302A-C may be determined based on latches in the IC design. Logic domain representation 301 may be received in block 201 of method 200 of FIG. 2.

Physical domain representation 303 may be generated in block 202 of method 200 of FIG. 2 based on logic domain representation 301. The physical domain representation 303 includes a plurality of logic clusters 304A-C. Logic cluster 304A includes the elements of logic partition 302A of logic domain representation 301. Logic cluster 304B includes the elements of logic partition 302B of logic domain representation 301. Logic cluster 304C includes the elements of logic partition 302C of logic domain representation 301. As illustrated in FIG. 3, the logic clusters 304A-C may be spread across the IC based on, for example, fixed constraints and physical boundaries for physical locations on the chip. As shown in the physical domain representation 303 (which may also be referred to as a floorplan), the locations of the elements of the various logic clusters 304A-C are not bound by boundaries of the logic partitions 302A-C in the logic domain representation 301. The elements of each of logic clusters 304A-C may not be contiguous, and may be located in any appropriate locations within the physical domain representation 303. The physical domain representation 303 may include information such as wiring layout, pin information, and physical location of elements in the IC, but may not include timing information for the logic clusters 304A-C.

As described above with respect to block 202 of method 200 of FIG. 2, a unique identifier (e.g., a prefix) may be added to each element (e.g., logic gate) in the physical domain representation 303 that identifies the element's corresponding logic partition (e.g., of logic partitions 302A-C) in the logic domain representation 301. Further, input and output pins of the logic gates may be assigned unique names that are derived based on the unique gate identifiers in block 204. Timing information (or power or other physical characteristics) for a particular logic partition (e.g., logic partition 302A) may be determined based on the logic partition identifiers and pin names associated with the elements in the associated logic cluster (e.g., logic cluster 304A) in the physical domain, even though portions of the logic cluster may be in non-contiguous portions of the IC in the physical domain representation 303. Timing data regarding the logic partitions 302A-C may thereby be determined from the physical domain representation 303 based on the relationship, as defined by the unique identifiers and pin names that were assigned in blocks 202 and 203 of method 200 of FIG. 2, to the logic domain representation 301. The ability to collect such timing data for a logic partition in the physical domain may provide, for example, a logic designer the ability to rework the timing of the logic partition if needed. Further, physical design information, such as specific pin information, may be retrieved from the logic clusters 304A-C for the logic partitions 302A-C in the logic domain representation 301 of the IC using the unique identifiers that are assigned to the elements of the logic clusters 304A-C. Example embodiments of data that may be generated based on the unique logic partition identifiers assigned to the elements of the logic clusters 304A-C in physical domain representation 303 are illustrated below with respect to FIG. 4.

It is to be understood that the block diagram of FIG. 3 is not intended to indicate that the system 300 is to include all of the components shown in FIG. 3. Rather, the system 300 can include any appropriate fewer or additional components not illustrated in FIG. 3 (e.g., logic partitions, logic clusters, IC elements, connections between logic partitions, modules, inputs, outputs, etc.). Further, the embodiments described herein with respect to system 300 may be implemented with any appropriate logic, wherein the logic, as referred to herein, can include any suitable hardware (e.g., a processor, an embedded controller, or an application-specific integrated circuit, among others), software (e.g., an application, among others), firmware, or any suitable combination of hardware, software, and firmware, in various embodiments.

FIG. 4 shows another system 400 for logic partition reporting for an IC design in accordance with one or more embodiments of the present invention. System 400 of FIG. 4 illustrates logic partition reports 401-404, each corresponding to a respective logic partition (e.g., logic partitions 1-4) in an IC design, such as logic partition 302A-C in logic domain representation 301 of FIG. 3. Each logic partition report 401-404 may be generated in block 204 of FIG. 2 based on the unique identifiers and pin names that were assigned to the elements of each logic cluster in blocks 202 and 203 of method 200 of FIG. 2, such that the system 400 may provide timing information for elements belonging to a particular logic partition no matter where the elements are located in the logic clusters 304A-C of the physical domain representation 303 of the IC. The logic partition reports 401-404 may be generated in block 204 of method 200 of FIG. 2. Each logic partition report 401-404 may include any appropriate information regarding a logic partition, including but not limited to information regarding the gates in the logic partition, the pins in the logic partition, negative endpoints in the logic partition (NumNegs), and timing information such as an amount of slack in the logic partition. For a logic partition having a relatively large amount of slack, as indicated by the logic partition's logic partition report, a designer may rework the logic partition to reduce the amount of slack based on the logic partition report.

In some embodiments, system 400 of FIG. 4 may include logic partition reports including power information instead of timing information. Such power information reports may be generated in block 204 of FIG. 2 based on the unique identifiers and pin names that were assigned in blocks 202 and 203 of FIG. 2. The power information may include any appropriate information, such as a number of latches, total parasitic capacitance, power calculation values such as dynamic and short-circuit, and/or leakage power numbers. A designer may use the power information from a logic partition report to determine the total power consumption of the IC design and/or power consumption per area. The power information may be used to determine, for example, an amount of decoupling capacitance that is required, and may also be used to determine logic repartitioning and physical planning based on any potential problems in the design.

It is to be understood that the block diagram of FIG. 4 is not intended to indicate that the system 400 is to include all of the components shown in FIG. 4. Rather, the system 400 can include any appropriate fewer or additional components not illustrated in FIG. 4 (e.g., data fields, logic partition reports, additional memory components, embedded controllers, logic partitions, connections between logic partitions, modules, inputs, outputs, etc.). Further, the embodiments described herein with respect to system 400 may be implemented with any appropriate logic, wherein the logic, as referred to herein, can include any suitable hardware (e.g., a processor, an embedded controller, or an application-specific integrated circuit, among others), software (e.g., an application, among others), firmware, or any suitable combination of hardware, software, and firmware, in various embodiments.

Figure 5:
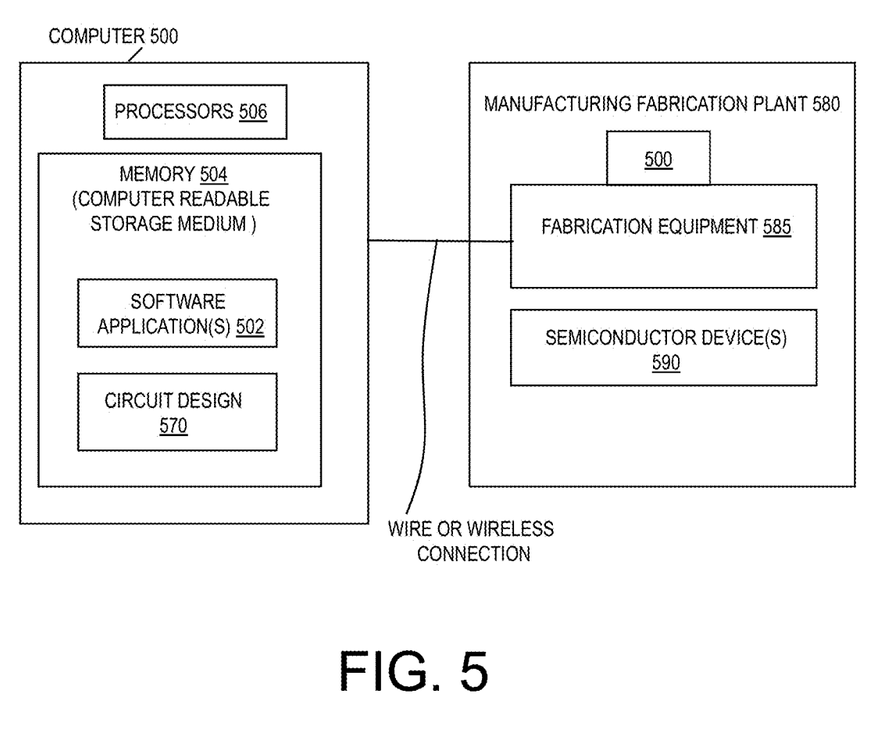
FIG. 5 depicts a system of a computer system integrated with a manufacturing fabrication plant according to embodiments of the invention.

In some embodiments, a semiconductor layout (or IC design) can be generated using the computer system 500 shown in FIG. 5. The computer system 500 has one or more software applications 502 configured to function and implement operations as discussed herein. For example, software applications 502 may include one or more routines for logic partition reporting for an IC design. A semiconductor layout can be constructed by the software application 502 of the computer 500 according to method 200 of FIG. 2 as described above to build the semiconductor device (e.g., an integrated circuit) in block 205 of FIG. 2. The computer 500 is configured to guarantee design rule cleanliness (i.e., pass) for the semiconductor device before and/or without requiring a design rule check. The software applications 502 include, integrate, are coupled to, and/or function as electronic design automation (EDA), also referred to as electronic computer-aided design (ECAD). Electronic design automation is a category of software tools for designing electronic systems such as integrated circuits and printed circuit boards. The tools work together in a design flow that chip designers use to design and analyze entire semiconductor chips. In some implementations, the computer 500 is coupled to, integrated with, and/or part of the fabrication equipment 585 at the manufacturing fabrication plant 580 (so as to communicate with and/or control operations of the fabrication equipment 585) to thereby fabricate semiconductor device(s) 590 as depicted in FIG. 5, as understood by one skilled in the art. The computer 500 includes one or processors 506 configured to execute one or more software applications 502 in memory 504. The computer 500 receives input of a design 570 for the semiconductor device 590, and the computer 500 is configured to develop/form the semiconductor layout for the semiconductor device in order to build the semiconductor device. The semiconductor layout is a physical design released to the manufacturing fabrication (Fab) plant 580 and physically fabricated by the fabrication equipment 585 to produce the semiconductor device 590. The manufacturing fabrication plant 580 builds the photo mask from the semiconductor layout as a physical design, and then builds the actual product using the photo mask. The product is an integrated circuit (i.e., semiconductor device 590) on a wafer according to the semiconductor layout (physical design). There may be numerous integrated circuits on a wafer, and each integrated circuit may be diced into an individual chip.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
generating, by a processor, a physical domain representation of an integrated circuit (IC) design based on a logic domain representation of the IC design, wherein the logic domain representation comprises a plurality of logic partitions, and wherein the physical domain representation comprises a plurality of logic clusters, each of the plurality of logic clusters corresponding to a respective logic partition of the plurality of logic partitions, wherein each of the plurality of logic clusters comprises a respective plurality of IC elements corresponding to the respective logic partition;
assigning a logic partition identifier to each IC element of the plurality of IC elements in the physical domain representation, wherein the logic partition identifier of an IC element corresponds to a logic partition of the plurality of logic partitions, and wherein each IC element comprises a plurality of pins;
assigning a pin name to each of the plurality of pins corresponding to the plurality of IC elements, wherein a pin name of a pin of the plurality of pins is derived based on the logic partition identifier of the IC element associated with the pin; and
generating a timing report for a logic cluster of the IC design based on the logic partition identifiers and the pin names of the IC elements in the logic cluster, wherein the timing report comprises slack information, slew information, pin names, gate delay information, net delay information, and a physical location of a gate.

2. The method of claim 1, wherein the timing report comprises respective timing information for each of a plurality of pins in a path of the IC design.

3. The method of claim 1, wherein the logic partition identifier comprises a prefix, and wherein the pin name is derived from the prefix.

4. The method of claim 1, wherein the timing report comprises information corresponding to the logic cluster and a plurality of direct child logic clusters of the logic cluster.

5. The method of claim 1, further comprising generating a power report for the logic cluster based on the logic partition identifiers and the pin names.

6. The method of claim 5, wherein the power report comprises a number of latches, a total parasitic capacitance, a dynamic power calculation value, a short-circuit calculation value, and a leakage power.

7. A system comprising:
a memory having computer readable instructions; and
one or more processors for executing the computer readable instructions, the computer readable instructions controlling the one or more processors to perform operations comprising:
generating a physical domain representation of an integrated circuit (IC) design based on a logic domain representation of the IC design, wherein the logic domain representation comprises a plurality of logic partitions, and wherein the physical domain representation comprises a plurality of logic clusters, each of the plurality of logic clusters corresponding to a respective logic partition of the plurality of logic partitions, wherein each of the plurality of logic clusters comprises a respective plurality of IC elements corresponding to the respective logic partition;

assigning a logic partition identifier to each IC element of the plurality of IC elements in the physical domain representation, wherein the logic partition identifier of an IC element corresponds to a logic partition of the plurality of logic partitions, and wherein each IC element comprises a plurality of pins;

assigning a pin name to each of the plurality of pins corresponding to the plurality of IC elements, wherein a pin name of a pin of the plurality of pins is derived based on the logic partition identifier of the IC element associated with the pin; and generating a timing report for a logic cluster of the IC design based on the logic partition identifiers and the pin names of the IC elements in the logic cluster, wherein the timing report comprises slack information, slew information, pin names, gate delay information, net delay information, and a physical location of a gate.

8. The system of claim 7, wherein the timing report comprises respective timing information for each of a plurality of pins in a path of the IC design.

9. The system of claim 7, wherein the logic partition identifier comprises a prefix, and wherein the pin name is derived from the prefix.

10. The system of claim 7, wherein the timing report comprise information corresponding to the logic cluster and a plurality of direct child logic clusters of the logic cluster.

11. The system of claim 7, further comprising generating a power report for the logic cluster based on the logic partition identifiers and the pin names.

12. The system of claim 11, wherein the power report comprises a number of latches, a total parasitic capacitance, a dynamic power calculation value, a short-circuit calculation value, and a leakage power.

13. A computer program product comprising a computer readable storage medium having program instructions embodied therewith, the program instructions executable by a processor to cause the processor to perform operations comprising:

generating a physical domain representation of an integrated circuit (IC) design based on a logic domain representation of the IC design, wherein the logic domain representation comprises a plurality of logic partitions, and wherein the physical domain representation comprises a plurality of logic clusters, each of the plurality of logic clusters corresponding to a respective logic partition of the plurality of logic partitions, wherein each of the plurality of logic clusters comprises a respective plurality of IC elements corresponding to the respective logic partition;

assigning a logic partition identifier to each IC element of the plurality of IC elements in the physical domain representation, wherein the logic partition identifier of an IC element corresponds to a logic partition of the plurality of logic partitions, and wherein each IC element comprises a plurality of pins;

assigning a pin name to each of the plurality of pins corresponding to the plurality of IC elements, wherein a pin name of a pin of the plurality of pins is derived based on the logic partition identifier of the IC element associated with the pin; and generating a timing report for a logic cluster of the IC design based on the logic partition identifiers and the pin names of the IC elements in the logic cluster, wherein the timing report comprises slack information, slew information, pin names, gate delay information, net delay information, and a physical location of a gate.

14. The computer program product of claim 13, wherein the timing report comprises respective timing information for each of a plurality of pins in a path of the IC design.

15. The computer program product of claim 13, wherein the logic partition identifier comprises a prefix, and wherein the pin name is derived from the prefix.

16. The computer program product of claim 13, wherein the timing report comprise information corresponding to the logic cluster and a plurality of direct child logic clusters of the logic cluster.

17. The computer program product of claim 13, further comprising generating a power report for the logic cluster based on the logic partition identifiers and the pin names.

* * * * *